(12) United States Patent
Chandhoke

(10) Patent No.: US 8,155,769 B2
(45) Date of Patent: Apr. 10, 2012

(54) INDUSTRIAL CONTROL WITH INTEGRATED MACHINE VISION

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1059 days.

(21) Appl. No.: 12/049,772

(22) Filed: Mar. 17, 2008

(65) Prior Publication Data

US 2009/0234471 A1 Sep. 17, 2009

(51) Int. Cl.
*G05B 19/42* (2006.01)
(52) U.S. Cl. .................................. 700/86; 700/2; 700/9
(58) Field of Classification Search .................. 700/2, 9, 700/86
See application file for complete search history.

(56) References Cited

U.S. PATENT DOCUMENTS

| | | | |
|---|---|---|---|
| 5,539,975 A | 7/1996 | Kukuljan et al. | |
| 5,724,272 A | 3/1998 | Mitchell et al. | |
| 5,870,619 A * | 2/1999 | Wilkinson et al. | 712/20 |
| 6,285,966 B1 * | 9/2001 | Brown et al. | 702/188 |
| 7,076,332 B2 | 7/2006 | Chandhoke et al. | |
| 7,076,740 B2 | 7/2006 | Santori et al. | |
| 7,127,100 B2 | 10/2006 | Wenzel et al. | |
| 7,146,347 B1 | 12/2006 | Vazquez et al. | |
| 7,346,411 B2 | 3/2008 | Silva et al. | |
| 7,379,777 B2 | 5/2008 | Chandhoke et al. | |
| 2002/0129333 A1 | 9/2002 | Chandhoke et al. | |
| 2002/0191023 A1 | 12/2002 | Chandhoke et al. | |
| 2003/0139848 A1 * | 7/2003 | Cifra et al. | 700/245 |
| 2007/0162157 A1 | 7/2007 | Chandhoke | |

OTHER PUBLICATIONS

U.S. Appl. No. 09/595,003, entitled "System and method for automatically generating a graphical program to implement a prototype", by Vazquez, et al., filed Jun. 13, 2000.
U.S. Appl. No. 11/875,059, entitled "Programmable Controller with Multiple Processors Using Scanning and Data Acquisition Architectures", by Sundeep Chandhoke, filed Oct. 19, 2007.

* cited by examiner

*Primary Examiner* — Kakali Chaki
*Assistant Examiner* — Carlos Ortiz Rodriguez
(74) *Attorney, Agent, or Firm* — Meyertons Hood Kivlin Kowert & Goetzel, P.C.; Jeffrey C. Hood; Joel L. Stevens

(57) ABSTRACT

System and method for performing industrial control. A vision engine operable to execute vision functions to control a vision element in response to received asynchronous commands is stored on a vision system. An application programming interface (API) that provides access to the vision engine is stored. The API includes multiple function blocks operable to be included in an industrial control application, and executable to send the asynchronous commands to the vision engine. The application is created, including inserting at least one function block of the API into the application. The application is executed on a programmable controller, including executing the function block to send a corresponding asynchronous command to the vision engine. The vision engine performs a vision function corresponding to the function block in response to the asynchronous command, and sends resultant data to the industrial control application, which stores the resultant data.

21 Claims, 8 Drawing Sheets

INDUSTRIAL CONTROL WITH INTEGRATED MACHINE VISION

FIELD OF THE INVENTION

The present invention relates to the field of programmable controllers, and more particularly to industrial control with integrated machine vision.

DESCRIPTION OF THE RELATED ART

In recent years, industrial controllers have become central for controlling many aspects of industrial testing, production, and operations, e.g., as part of control, measurement, and automation systems. In many industrial control applications, machine vision functionality is also required.

Current industrial control applications that include machine vision functionality generally do so in the following ways:

A vision system (that includes or is coupled to a camera or other vision element) is configured to execute some pre-defined script or pre-defined set of functions. The data generated by this script or functions are exported via tags/variables. A programmable logic controller (PLC) that executes sequential logic for the rest of the machine/process accesses these variables/tags via standard industrial protocols such as CIP/Modbus, etc. The camera is also controlled (e.g., started/stopped, etc.) by the PLC using similar tags, or in some cases, via explicit digital I/O signals communicated between the PLC and the camera/vision system. An example of this approach is used in the Compact Vision System using a configuration tool such as Vision Builder AI, both provided by National Instruments Corporation.

Many vision systems also allow creation of a custom application/script that executes on the vision system. This allows for higher degree of customization as compared to the above approach, but increases the complexity for the user, since in this case the PLC user is required to develop two applications/tasks: one that executes the sequential logic on the PLC, and a vision application that executes on the smart camera/vision system. Similar to the above approach, the user must use tags/variables and/or digital I/O to coordinate the two applications. An example of this approach is the Compact Vision System running a custom application written using Lab-VIEW-RT, also provided by National Instruments Corporation.

However, in both of these approaches, the user is required to develop two separate applications, and to coordinate execution of these applications on multiple systems, which may be extremely cumbersome, especially if multiple vision systems/cameras are involved.

Thus, improved systems and methods for performing industrial control are desired.

SUMMARY OF THE INVENTION

Various embodiments of a system and method for industrial control with integrated machine vision are presented.

A vision engine may be stored on a vision system, e.g., in a memory medium of the vision system, where the vision engine is operable to execute vision functions to control a vision element (or multiple vision elements) in response to received asynchronous commands. The vision element may be any kind of vision sensor desired, e.g., a camera, photon counter, etc.

An application programming interface (API) that provides access to the vision engine may also be stored. The API may include a plurality of function blocks that are operable to be included in an industrial control application, where the function blocks are executable to send the asynchronous commands to the vision engine. The API may be implemented in any of a variety of ways. For example, in some embodiments, the API may include one or more menus or lists of API functions, e.g., textual program functions, from the user may select for inclusion in the industrial control application, or one or more graphical program nodes, e.g., a palette of graphical program nodes, from which the user may select nodes for inclusion in a graphical program, where each node implements or corresponds to a function block. In this embodiment, the industrial control application may be a graphical program, where the graphical program includes a plurality of interconnected nodes that visually indicate functionality of the graphical program, and where the graphical program includes at least one graphical program node from the API. Of course, any other programming languages may be used as desired.

In preferred embodiments, the vision engine may include program instructions corresponding to the function blocks, where the program instructions implement the functionality corresponding to the function blocks. Thus, for example, the program instructions corresponding to the function blocks may be "built in" to the vision engine. In other embodiments, the program instructions corresponding to the function blocks may be deployed to the vision engine as part of an initialization process, e.g., by the vendor, or by the user. In some embodiments, various subsets of all available function blocks may be supported by the vision engine/API as desired.

The industrial control application may be created, including inserting at least one function block of the API into the industrial control application. For example, the industrial control application may be created via a programming development environment on a host computer, such as, for example, the LabVIEW graphical program development environment provided by National Instruments Corporation, although any other development environments may be used as desired.

The industrial control application may be executed on a programmable controller, including executing the at least one function block to send a corresponding at least one asynchronous command to the vision engine. For example, in one embodiment, the industrial control application includes industrial control functionality, e.g., in the form of industrial control, i.e., automation or motion, function blocks, as well as the above-mentioned at least one function block for machine vision functionality, which may be referred to as a vision function block. Thus, executing the industrial control application may include executing one or more automation or motion function blocks to control or otherwise communicate with various industrial automation and control devices, as well as executing the at least one vision function block to interact with the vision system by generating one or more asynchronous commands for the vision system.

The vision engine may perform at least one vision function corresponding to the at least one function block in response to the at least one asynchronous command, and send resultant data to the industrial control application, which may store the resultant data. Thus, during execution of the industrial control application, asynchronous commands may be sent to the vision system, which may execute vision scripts in response, and send resultant data back to the industrial control application, which stores the data. Note that the resultant data may be used for any of a variety of purposes. For example, in some embodiments, the industrial control application may use the resultant data for state transitions or sequencing of the application logic, among other uses.

The at least one vision function performed by the vision engine may be implemented by a script (or a plurality of scripts) stored on the vision engine. As will be described in more detail below, the vision engine may store a plurality of scripts, corresponding to the function blocks of the API. In various embodiments, these scripts may be implemented in any of various ways, including text-based programs, graphical programs, and so forth.

In preferred embodiments, the method may also include storing at least one custom function block, where the at least one custom function block is operable to be included in the industrial control application, and may specify execution of at least one custom vision function. In other words, the at least one function block inserted into the industrial control application may be a pre-defined, e.g., vendor-supplied, function block, whereas the at least one custom function block may be user-developed, and may provide functionality not available via pre-defined or vendor-supplied function blocks. Thus, creating the industrial control application may include inserting the at least one custom function block into the industrial control application.

First program instructions corresponding to the custom function block may be deployed to the vision engine, e.g., from a host computer, or even via the programmable controller, where the first program instructions implement the at least one custom vision function. Executing the industrial control application may thus include executing the custom function block, where executing the custom function block includes sending a corresponding one or more first asynchronous commands to the vision engine. The vision engine may execute the first program instructions to perform the at least one custom vision function corresponding to the at least one custom function block in response to the one or more first asynchronous commands.

A function block may include not only executable code, but state information as well, e.g., stored in a data structure, which may affect or determine the functionality of the function block, e.g., possibly including the functionality of associated scripts. This capability to maintain state information may allow the vision scripts on the vision system to execute asynchronously and somewhat autonomously with respect to the industrial application. In other words, depending on the state of the system, e.g., the state of the industrial control application, the vision system, the executing vision script, etc., different, e.g., successive, executions of a function block may result in different functionality being performed by the vision system.

For example, in some embodiments, executing the industrial control application includes executing the industrial control application in an iterative manner, which may include executing the at least one function block for each of one or more iterations of the industrial control application to send respective asynchronous commands to the vision engine. In response to each respective asynchronous command, the vision system may perform one or more of: continuing performing the at least one vision function, monitoring the performing the at least one vision function, providing a result of the performing the at least one vision function, and/or terminating the performing the at least one vision function. Thus, the same function block, when executed multiple times, may send different asynchronous commands to the vision system, based on state information maintained by the function block.

In some embodiments, the method may further include storing a plurality of device profiles, where each device profile facilitates communication between the programmable logic controller and the vision engine via a respective transmission protocol, such as any of the various transmission protocols mentioned above, including protocols for both deterministic and non-deterministic buses. Examples of device profiles are described below.

Thus, in some embodiments, an industrial control system may include a vision system that includes a vision element, a processor (which may be a processor core) coupled to the vision element, and a memory coupled to the processor, where the memory stores a vision engine operable to execute vision functions to control the vision element in response to received asynchronous commands. The industrial control system may also include a programmable controller, configured to implement an industrial control application, wherein the industrial control application includes at least one function block executable to provide the asynchronous commands to the vision system according to an application programming interface (API), as described above. The industrial controller may include a processor and memory, and/or may include a programmable hardware element.

Thus, various embodiments of the above systems and methods may implement and perform industrial control with integrated machine vision.

BRIEF DESCRIPTION OF THE DRAWINGS

A better understanding of the present invention can be obtained when the following detailed description of the preferred embodiment is considered in conjunction with the following drawings, in which.

Figure 1A:
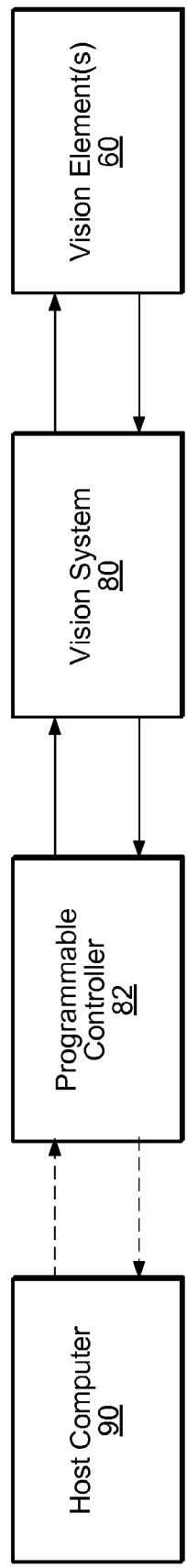
FIG. 1A illustrates an industrial control system that includes an industrial controller and a separate vision system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. application Ser. No. 11/338,922, titled "System and Method for Automatically Updating the Memory Map of a Programmable Logic Controller to Customized Hardware", filed Jan. 24, 2006.

U.S. application Ser. No. 11/427,052, titled "System and Method for Automatically Updating the Memory Map of a Programmable Controller to Customized Hardware," filed Jun. 28, 2006.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may include two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE 7 from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. A LabVIEW graphical program, may be referred to as a "virtual instrument" (VI).

The term "graphical program" includes models or block diagrams created in graphical modeling environments, wherein the model or block diagram includes interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may include only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may include a single window having one or more GUI Elements, or may include a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may include GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements include input controls and output indicators Input Control—a graphical user interface element for providing user input to a program. Exemplary input controls include dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, an industrial control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as an industrial control system or to a sensor, in response to particular data. A measurement device may also be operable to perform automation functions, i.e., may receive and analyze data, and issue automation control signals in response.

Programmable Controller—programmable controllers may include programmable logic controllers (PLCs), programmable automation controllers (PACs), distributed control systems (DCSs), and/or other programmable controllers which utilize scanning architectures.

Task—A task may be included in a programmable controller and may itself include programs and variables, e.g., variables used by the programs. A task may define the schedule and/or manner in which the programs may be executed on the programmable controller, and may include a memory table that is updated before the execution of programs included in the task. For execution, the programs in the task may be assigned an execution order within the task, i.e., the order defines priority of program execution. Additionally, in a multitasking environment, each task may be assigned a specified priority with respect to the other tasks.

Axis—a logical grouping that includes the components needed to control a parameter, e.g., position or velocity, in an industrial control system. For example, an industrial control axis may include a motor (i.e., actuator), encoder (optionally), IO needed to control the motor effectively (limit switches, home sensors etc.), and control software (supervisory control, trajectory generation, position, velocity and current control loops) for the motor.

Programmable Controllers

The following describes embodiments of systems which utilize programmable logic controllers (PLCs), programmable automation controllers (PACs), and/or distributed DCSs. Note that embodiments herein described with respect to PLCs may equally apply to embodiments with PACs and/or DCSs. In particular the embodiments may apply to those programmable controllers which implement scanning architectures, such as, for example, those described below. Note however, that the programmable controllers are not limited to those described herein, and that other programmable controllers are envisioned, including, for example, personal computer or workstations, which may be referred to as "host" computers. The term "programmable controller" is intended to refer to any of the above, as well as a programmable hardware element configured to implement controller functionality, such as a field programmable gate array (FPGA).

The term "programmable automation controller" is intended to capture the full breadth of its ordinary meaning and at least includes the characteristics described herein. In general, PACs combine the features of normal PLCs, such as those described above, with the capabilities of computer system control systems, e.g., using a personal computer. In some cases, PACs may provide a more open, modular programming environment than provided by normal PLCs. Additionally, such PACs may provide the protection and stability provided by PLCs that personal computing systems generally lack. For example, the PACs may include a ruggedized housing for protection from the local environment which can sometimes be quite corrosive. Additionally, the PACs may be generally more stable than personal computing systems simply due to the nature of current standard personal computing operating systems. Thus, in some embodiments, at least one PAC, e.g., using the scanning architecture described herein (e.g., with reference to FIG. 3), may be used in conjunction with the architectures, systems, and methods described above.

Additionally, the term "distributed control system" is also intended to capture the full breadth of its ordinary meaning and at least includes the characteristics described herein. In general, DCSs include one or more instruments or computing systems for implementing various processes, such as those described above in relation to the use of PLCs. Thus, similar to the above descriptions regarding PACs, one or more DCSs may be used in conjunction with the systems and methods described herein.

Figure 1B:
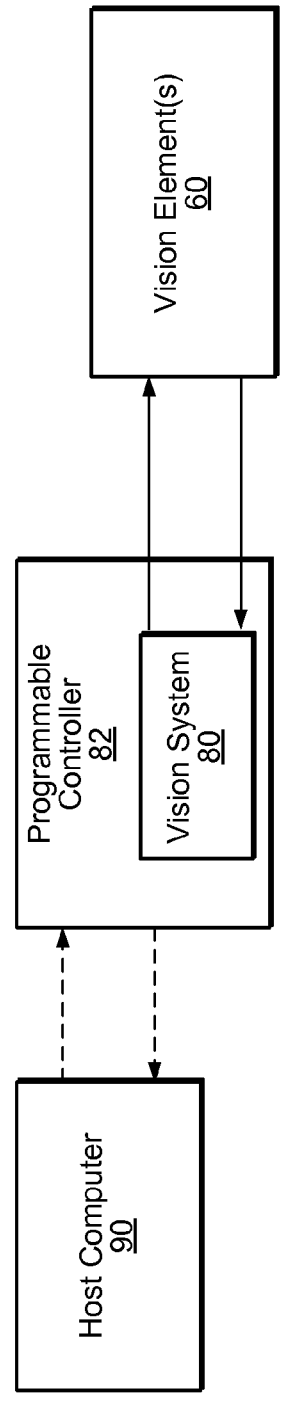
FIG. 1B illustrates an industrial control system that includes an industrial controller with an integrated vision system, according to one embodiment.

FIGS. 1A and 1B—Block Diagrams of Exemplary Industrial Control Systems

FIGS. 1A and 1B are high level block diagrams of industrial control systems, according to various embodiments. FIG. 1A illustrates a system wherein a host computer system 90 is communicatively coupled to a programmable controller 82, i.e., an industrial controller, which is in turn communicatively coupled to a vision system 80, which is coupled to at least one vision element 60, i.e., a vision device, such as a camera. The host computer system 90 may store a development environment for developing user industrial control programs, e.g., user application code and/or custom logic for machine vision functionality. For example, in one embodiment, the host computer system 90 may store a LabVIEW graphical program development environment, provided by National Instruments Corporation, which may be used to develop the industrial control programs, i.e., as graphical programs, although in other embodiments, any other development environments and programming languages may be used as desired. In some embodiments, these programs may then be provided, e.g., over a network, to the industrial controller and/or to the vision system 80 for execution. Thus, the host computer system 90 may be used during development of the industrial control system, but may not be required once the program(s) are deployed. In other embodiments, the host computer system 90 may store and execute one or more of the programs, e.g., operating as the programmable controller, or providing HMI (human-machine interface) functionality for the industrial control application, e.g., executing GUI code for the application.

Note that in preferred embodiments, the industrial control systems described herein include a PLC or PAC with integrated machine vision functionality, and may be referred to generically as a programmable controller, or simply a controller.

FIG. 1B illustrates an alternative embodiment where the industrial controller 82 incorporates the vision system 80. In other words, the various functionalities described above with respect to the industrial controller 82 and the vision system 80 may be performed by a single computer system, specifically, the programmable controller 82, although in other embodiments, the combined functionality may be implemented on the host computer system 90.

Figure 2A:
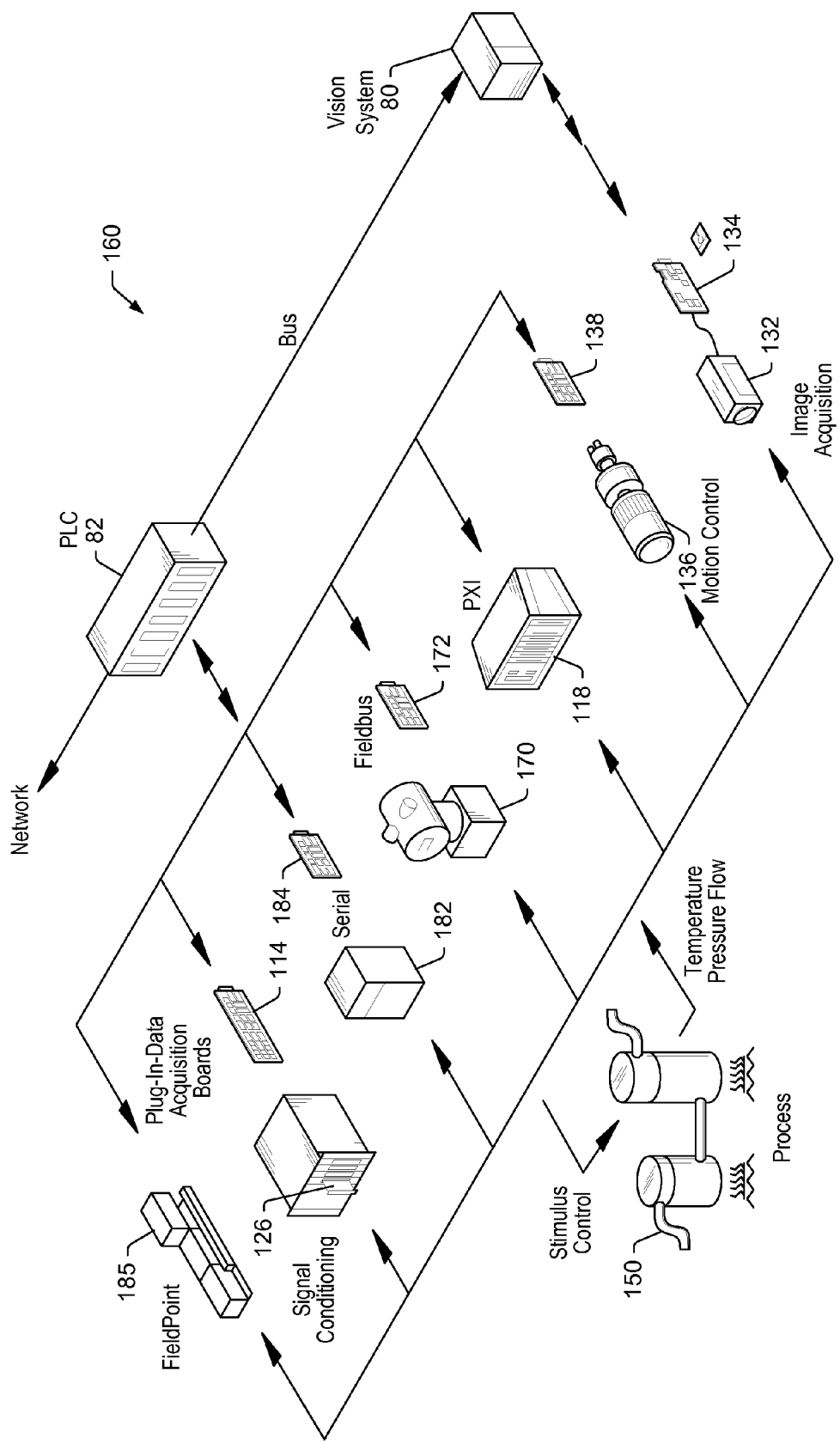
FIG. 2A illustrates an industrial control system that includes an industrial controller and a separate vision system, according to another embodiment.
Figure 2B:
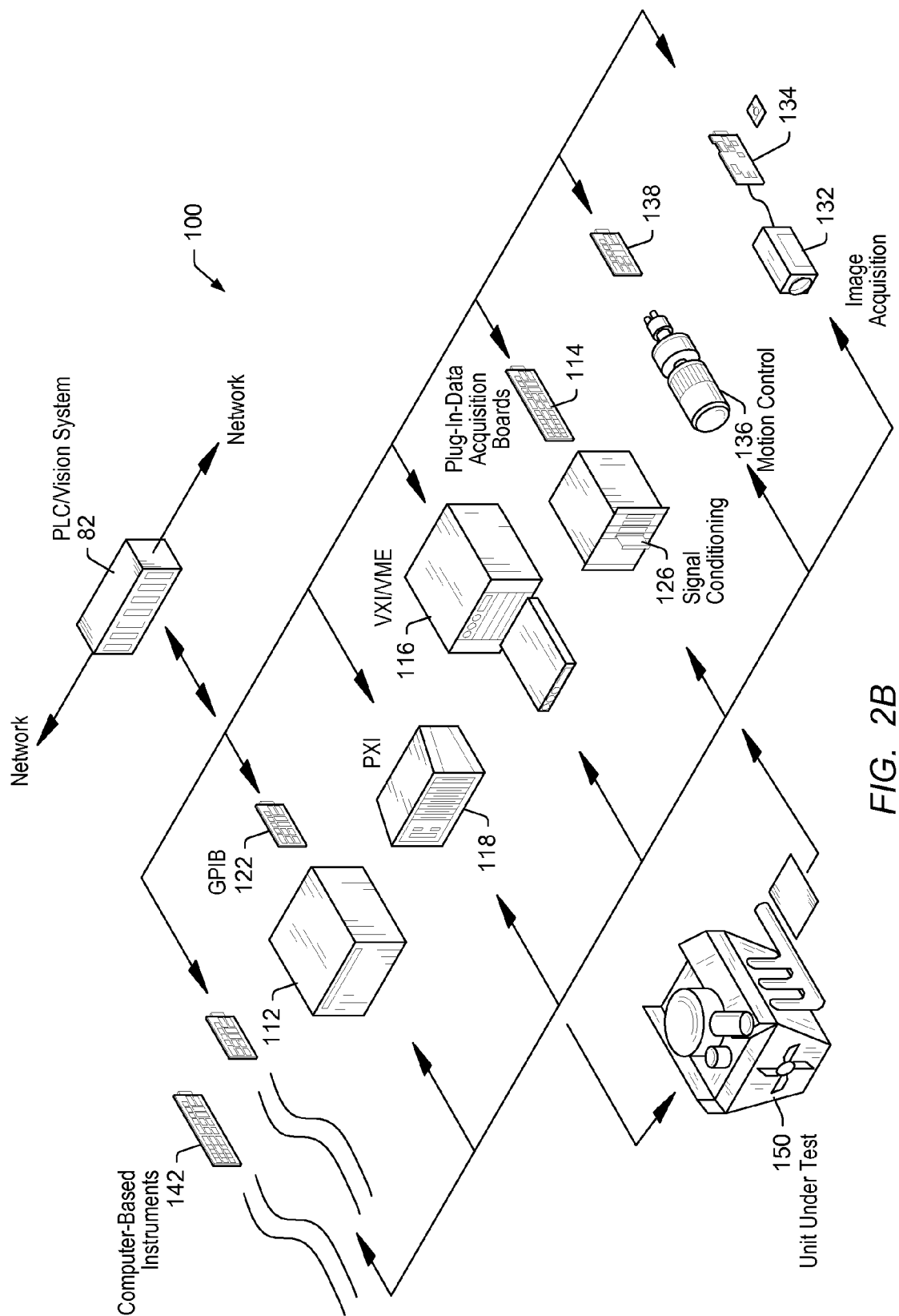
FIG. 2B illustrates an industrial control system that includes an industrial controller with an integrated vision system, according to another embodiment.

FIGS. 2A and 2B —Exemplary Industrial Automation and Control Systems

Embodiments of the present invention may be applicable in systems involved with performing test and/or measurement functions; controlling and/or modeling instrumentation or industrial automation hardware; modeling and simulation functions, e.g., modeling or simulating a device or product being developed or tested; vision systems, etc. However, it is noted that embodiments of the present invention may be used for a plethora of applications and are not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as network control, network monitoring, financial systems, games, etc.

FIG. 2A illustrates an exemplary industrial automation system 160 which may implement embodiments of the invention. The system 160 may include programmable logic controller 82 which couples to one or more devices or instruments. The PLC 82 (programmable controller) may include a processor and memory. The PLC 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others. Moreover, as also shown, the system may include a vision system 80, e.g., in a chassis, coupled to the PLC 82 via a bus, where the vision system 80 is coupled to one or more vision elements, e.g., a video device 132 and optionally, an associated image acquisition card 134. The PLC 82 may operate in conjunction with the vision system 80 to perform machine vision functions with respect to the process or device 150, as will be described in more detail below.

The one or more devices coupled to the PLC for automation functionality may include a data acquisition board 114 and associated signal conditioning circuitry 126, a PXI instrument 118, a motion control device 136 and associated motion control interface card 138, a fieldbus device 170 and associated fieldbus interface card 172, a serial instrument 182 and associated serial interface card 184, or a distributed data acquisition system, such as the Fieldpoint system 185 available from National Instruments, among other types of devices.

FIG. 2B illustrates an exemplary instrumentation control system 100 which may implement embodiments of the invention. The instrumentation control system 100 is similar to the automation system 160 shown in FIG. 2A. Elements which are similar or identical to elements in FIG. 2A have the same reference numerals for convenience. The system 100 includes programmable logic controller 82, which may couple to one or more instruments, e.g., via a PHE. As described above, the PLC 82 may include a processor and memory. The PLC 82 may operate with the one or more instruments to analyze, measure, or control the unit under test (UUT) or process 150. In this embodiment, the PLC 82 also implements a vision system, e.g., implements the functionality of the vision system 80 of FIGS. 1A, 1B, and 2A. For example, in some embodiments, the PLC may include a multi-core processor, where the industrial control application is deployed to a first at least one processor core of the programmable controller (i.e., of the multi-core processor), and where the vision system is deployed to at least one other processor core of the programmable controller (i.e., of the multi-core processor).

The one or more instruments may include a GPIB instrument 112 and associated GPIB interface card 122, a data acquisition board 114 and associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The PLC may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

As noted above, in some embodiments, some or all of the PLC functionality may be implemented on a programmable hardware element, e.g., an FPGA. In other words, in addition to, or instead of, a processor, the programmable controller may include a programmable hardware element configured with industrial control programs according to embodiments of the present invention.

The PLC or controller may include one or more processors as well as a memory medium(s) coupled to the processor(s) on which one or more computer programs or software components may be stored. As used herein, "processors" may include processor cores or processing chips. For example, a programmable controller with multiple processors may include a single processing chip with multiple cores (e.g., 2, 4, 8, etc.) or may include multiple processing chips (e.g., multiple central processing units), where each processing chip includes one or more processors. Multiple processors may refer to any combination of chips and cores. The memory medium may store one or more programs which are executable to perform the methods described herein. In some embodiments, the programs may include graphical programs. Various embodiments further include receiving or storing instructions and/or data implemented in accordance with the descriptions presented herein upon a memory medium and/or a carrier medium.

As indicated above, the controller may be coupled to one or more devices, e.g., any of the devices of FIGS. 2A and 2B. In some embodiments, the devices may be coupled directly to the PLC via an electrical interface. In other embodiments, the device(s) may also be coupled to the controller via an intermediary device, e.g., another controller, a PHE, or other suitable devices. In another embodiment, the devices may be implemented at a remote location and may be coupled to the controller via a network, e.g., LAN, WAN, Internet, Intranet, etc. In one embodiment, the controller may communicate directly with the one or more devices, or, alternatively, an intermediary device may provide a network communication interface between the controller and the remote devices. In various embodiments, the controller may communicate with the remote devices directly, or via an intermediary device, using any of a variety of communication protocols, e.g., TCP/IP, GPIB, Ethernet (e.g., CSMA/CD), Local Talk (e.g., CSMA/CA), Token Ring, FDDI, ATM, NetBEUI, IPX/SPX, IPv6, CANopen, DeviceNet, PROFInet, EtherNet/IP, EtherCAT, Ethernet Powerlink, SERCOS, or other suitable communication protocols.

In some embodiments, the controller may be included in or coupled to a chassis. In various embodiments, the chassis may include one or more module expansion slots operable to receive expansion modules. The expansion slots may be operable to receive any of a variety of expansion modules, including, PCI, PCI Express, ISA, PXI, VXI, GPIB, or other suitable form factors and/or card types. The expansion modules may be coupled to and may communicate with the controller via a backplane. For example, the backplane may include the programmable hardware element, e.g., the FPGA, which may operate to provide input and output to the controller from one or more devices included in or coupled to the chassis, e.g., the expansion modules plugged into the expansion slots or other devices coupled to the chassis. Additionally, in various embodiments, the backplane may implement any of a variety of buses, including, but not limited to, a VXI (VME eXtensions for Instrumentation) bus, a GPIB (General Purpose Interface Bus) bus, a PXI (PCI eXtensions for Instrumentation) bus, a CAN bus, a Profibus bus, a serial bus, a parallel bus, or other suitable buses. In some embodiments, where the backplane includes or is a PHE, a user may be able to program the PHE such that the backplane performs operations on the input and output from the controller and/or the devices coupled to the chassis.

As indicated in FIGS. 1A and 1B, in some embodiments, the controller may be coupled to a host computer system 90 via a network or a computer bus using any of various networks and protocols described above, among others. The computer system 90 may be any of various types, as desired. In some embodiments, a program executing on the computer system 90 may provide a human-machine interface (HMI) for the controller. For example, the program may be an HMI application executing on the host computer, and facilitating user interaction with the controller. In this embodiment, the program may receive input from a user on host computer system 90 with regard to instructions for the controller, which may then provide input to the controller accordingly. In some embodiments, the instructions may also be directed toward, and subsequently provided to, the PHE providing the hardware interface between the device(s) and the controller.

In some embodiments, the user programs, e.g., the industrial control application and any custom programs used, may execute in a distributed fashion. For example, with respect to the industrial control application, at least one portion of the program, e.g., at least one portion of a block diagram of the program, may be implemented and/or executed on one or more PHEs (or other processors) coupled to the controller and another portion, e.g., another portion of the block diagram, may be implemented and/or executed on the controller. In one embodiment, one portion, e.g., the program's GUI, of the program may be executed on the host computer system coupled to the controller. More specifically, in one embodiment, a portion of the program may execute on the controller (e.g., the controller may be configured according to the portion of the program) and another portion of the program (e.g., including the GUI of the program) may execute (e.g., concurrent to execution of the program portion on the controller) on the computer system 90, e.g., to provide an MMI for the program portion executing on the controller.

In further embodiments, the controller may be a "soft" PLC (or controller), i.e., a computer program running on a computer system such as host computer system 90 that mimics the operation of a standard PLC or PAC (or controller). For example, the computer program may be a graphical program, such as a LabVIEW graphical program, and may operate to perform all the functionality of controllers described herein.

Figure 3:
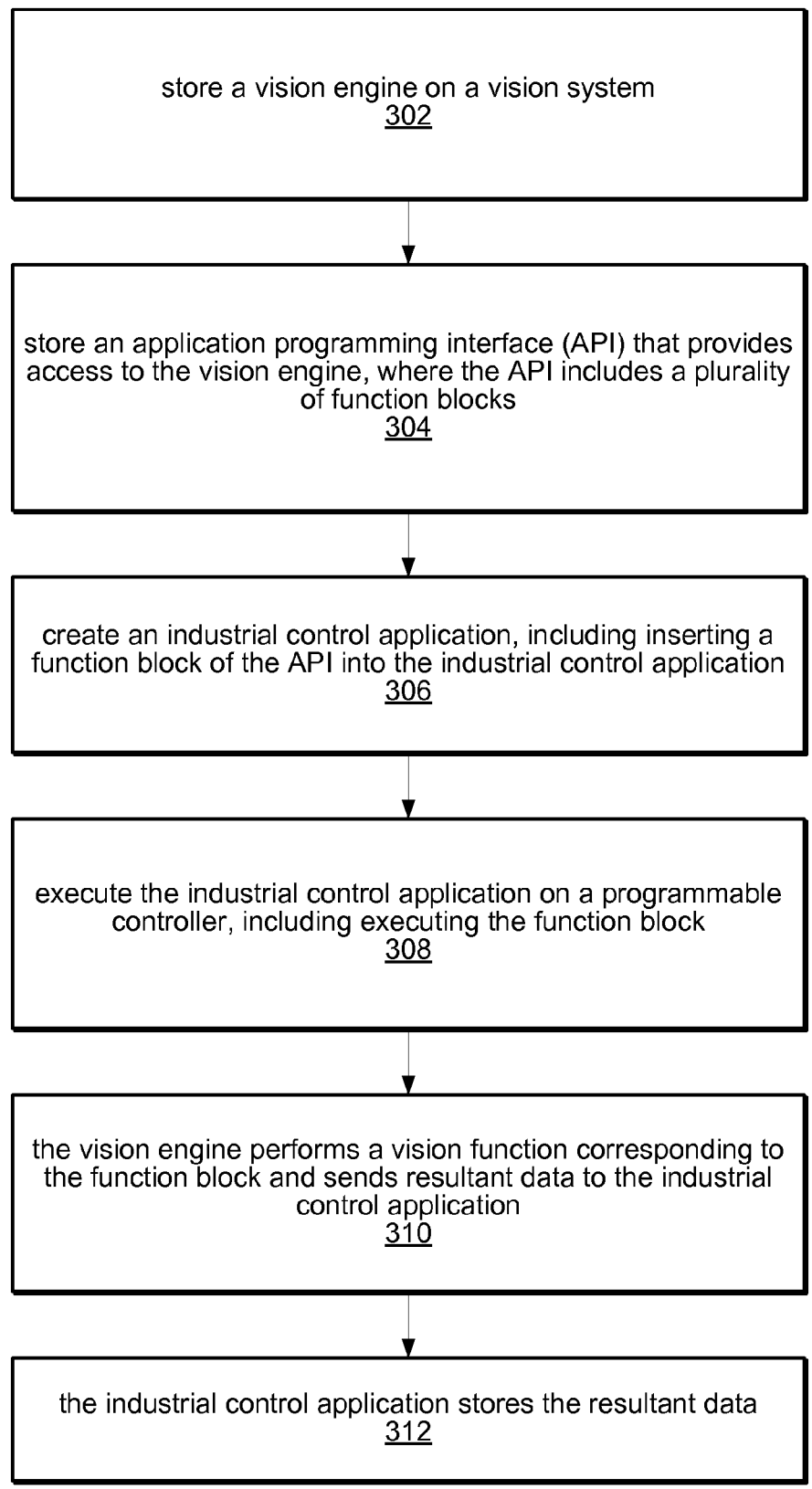
FIG. 3 is a high-level flowchart of a method for performing industrial control, according to one embodiment.

FIG. 3—Flowchart of a Method for Industrial Control

FIG. 3 is a high-level flowchart of a method for industrial control, according to one embodiment. In various embodiments, some of the method elements shown may be performed currently, in a different order than shown, or may be omitted. Additional method elements may be performed as desired. The method may be performed as follows:

In 302, a vision engine may be stored on a vision system, e.g., in a memory medium of the vision system, where the vision engine is operable to execute vision functions to control a vision element (or multiple vision elements) in response to received asynchronous commands. The vision element may be any kind of vision sensor desired, e.g., a camera, photon counter, etc. Thus, an engine may be provided that may be configured to perform vision functions using a vision element in response to asynchronous commands.

In 304, an application programming interface (API) that provides access to the vision engine may be stored. The API may include a plurality of function blocks that are operable to be included in an industrial control application, where the function blocks are executable to send the asynchronous commands to the vision engine. The API may be implemented in any of a variety of ways. For example, in some embodiments, the API may include one or more menus or lists of API functions, e.g., textual program functions, from the user may select for inclusion in the industrial control application. In another embodiment, the API may include one or more graphical program nodes, e.g., a palette of graphical program nodes, from which the user may select nodes for inclusion in a graphical program, where each node implements or corresponds to a function block. In this embodiment, the industrial control application may be a graphical program, where the graphical program includes a plurality of interconnected nodes that visually indicate functionality of the graphical program, and where the graphical program includes at least one graphical program node from the API. Of course, any other programming languages may be used as desired.

In preferred embodiments, the vision engine may include program instructions corresponding to the function blocks, where the program instructions implement the functionality corresponding to the function blocks. Thus, for example, the program instructions corresponding to the function blocks may be "built in" to the vision engine. In other embodiments, the program instructions corresponding to the function blocks may be deployed to the vision engine as part of an initialization process, e.g., by the vendor, or by the user. In some embodiments, various subsets of all available function blocks may be supported by the vision engine/API as desired.

As noted above, the function block API provides access to the vision system, e.g., from a PLC. It should be noted that simple as well as complex function blocks may be provided, e.g., by the vendor. Complex function blocks may be defined and configured via a configurable application to execute a series of vision functions. For example, an application such as Vision Builder AI, provided by National Instruments Corporation, may be used to configure a complex function block that executes a series of vision function when it executes.

In 306, the industrial control application may be created, where creating the industrial control application includes inserting at least one function block of the API into the industrial control application. For example, the industrial control application may be created via a programming development environment on a host computer, e.g., computer system 90, such as, for example, the LabVIEW graphical program development environment provided by National Instruments Corporation, although any other development environments may be used as desired. In some embodiments where the industrial control application is a graphical program, the developer may drag and drop graphical program nodes into a block diagram, including one or more graphical program nodes from the API, i.e., the at least one function block, and may interconnect the nodes as appropriate to implement the desired functionality.

In 308, the industrial control application may be executed on a programmable controller, e.g., PLC 82, including executing the at least one function block to send a corresponding at least one asynchronous command to the vision engine. For example, in one embodiment, the industrial control application includes industrial control functionality, e.g., in the form of industrial control, i.e., automation or motion, function blocks, as well as the above-mentioned at least one function block for machine vision functionality, which may be referred to as a vision function block. Thus, executing the industrial control application may include executing one or more automation or motion function blocks to control or otherwise communicate with various industrial automation and control devices, such as those shown in FIGS. 2A and 2B, as well as executing the at least one vision function block to interact with the vision system by generating one or more asynchronous commands for the vision system.

In 310, the vision engine may perform at least one vision function corresponding to the at least one function block in response to the at least one asynchronous command, and send resultant data to the industrial control application, which may store the resultant data, as indicated in 312. Thus, during execution of the industrial control application, asynchronous commands may be sent to the vision system, which may execute vision scripts in response, and send resultant data back to the industrial control application, which stores the data. Note that the resultant data may be used for any of a variety of purposes. For example, in some embodiments, the industrial control application may use the resultant data for state transitions or sequencing of the application logic, among other uses.

The at least one vision function performed by the vision engine may be implemented by a script (or a plurality of scripts) stored on the vision engine. As will be described in more detail below, the vision engine may store a plurality of scripts, corresponding to the function blocks of the API. In various embodiments, these scripts may be implemented in any of various ways, including text-based programs, graphical programs, and so forth.

In preferred embodiments, the method may also include storing at least one custom function block, where the at least one custom function block is operable to be included in the industrial control application, and may specify execution of at least one custom vision function. In other words, the at least one function block inserted into the industrial control application in 306 may be a pre-defined, e.g., vendor-supplied, function block, whereas the at least one custom function block may be user-developed, and may provide functionality not available via pre-defined or vendor-supplied function blocks. Thus, creating the industrial control application may include inserting the at least one custom function block into the industrial control application.

First program instructions corresponding to the custom function block may be deployed to the vision engine, e.g., from host computer 90, or even via the programmable controller 82, where the first program instructions implement the at least one custom vision function. Executing the industrial control application may thus include executing the custom function block, where executing the custom function block includes sending a corresponding one or more first asynchronous commands to the vision engine. The vision engine may execute the first program instructions to perform the at least one custom vision function corresponding to the at least one custom function block in response to the one or more first asynchronous commands.

Figure 4:
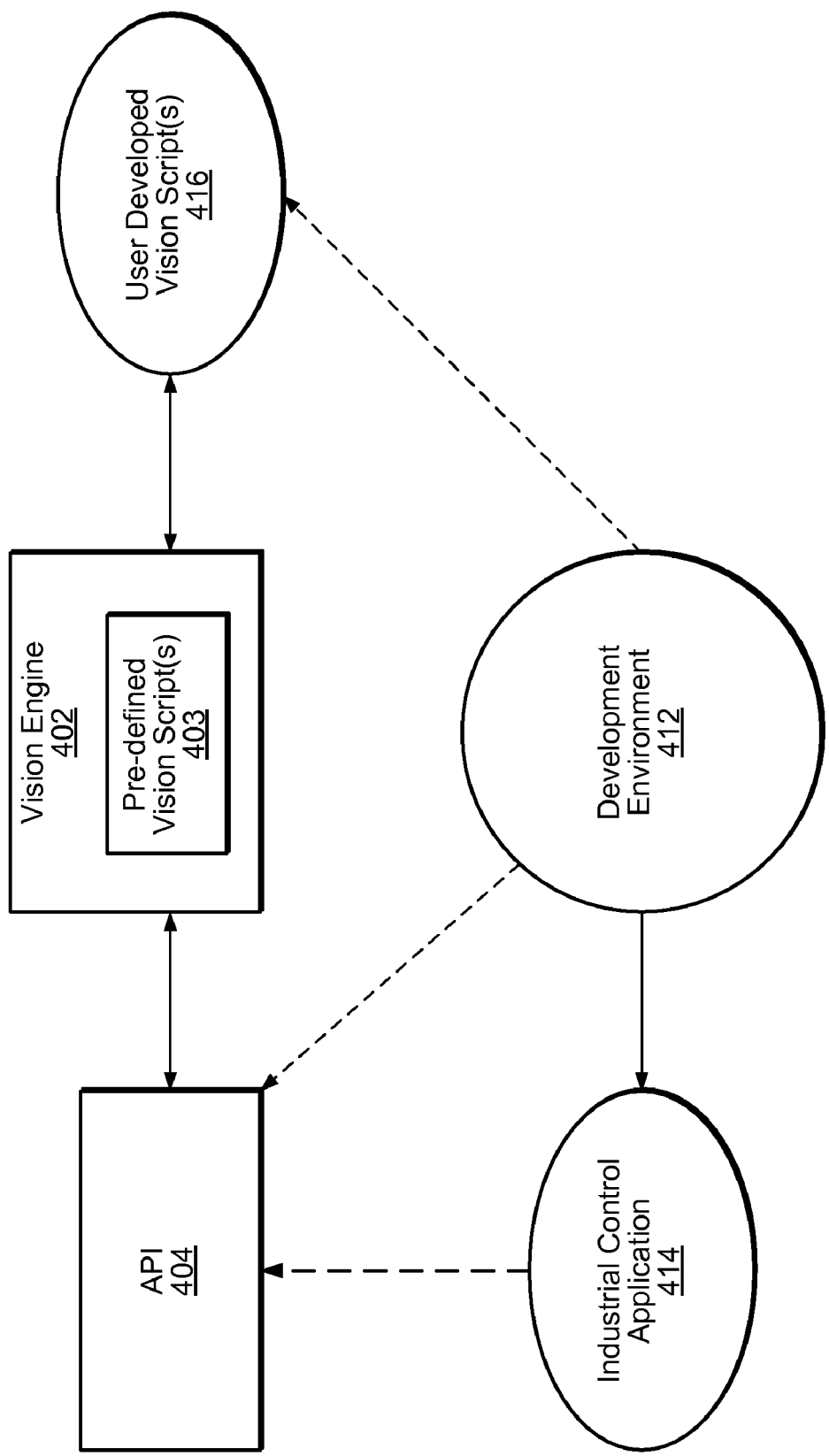
FIG. 4 is a block diagram illustrating industrial control system software and its interrelations, according to one embodiment.

FIG. 4 illustrates software programs and components, and their relationships, according to one embodiment. As FIG. 4 shows, a development environment 412, e.g., LabVIEW, may be used to develop an industrial control application 414, and/or a user-developed vision script 416 (which in some embodiments, may simply be a program, e.g., a graphical program), which may be deployed to the vision engine 402. The vision engine 402 may include pre-defined (e.g., vendor-supplied) vision scripts 403 corresponding to API function blocks 404, and implementing functionality for the function blocks. In some embodiments, the API 404 may be modified (manually or programmatically) to include a custom function block (e.g., a graphical program node) corresponding to the user-developed vision script 416, as indicated by the dashed arrow from the development environment to the API, and as discussed above.

As indicated, the industrial control application 414 may utilize the API 404 to interact with the vision engine 402 (via one or more function blocks inserted into the application), and the vision engine 402 may execute various of the pre-defined vision scripts 403, as well as the user-developed vision script 416, in response to commands sent from the application. Thus, the pre-defined vision script(s) and the user-developed script(s) may include program instructions corresponding to the various function blocks of the API (including any custom function blocks), where various portions of the program instructions are executable in response to asynchronous commands sent to the vision system by the industrial control application via execution of the function blocks.

As is well known to those of skill in the art of industrial control, a function block may include not only executable code, but state information as well, e.g., stored in a data structure, which may affect or determine the functionality of the function block, e.g., possibly including the functionality of associated scripts. For example, function block state information may include a counter, which may control function block functionality based on the counter value. This capability to maintain state information may allow the vision scripts on the vision system to execute asynchronously and somewhat autonomously with respect to the industrial application. In other words, depending on the state of the system, e.g., the state of the industrial control application, the vision system, the executing vision script, etc., different, e.g., successive, executions of a function block may result in different functionality being performed by the vision system.

For example, in some embodiments, executing the industrial control application includes executing the industrial control application in an iterative manner, which may include executing the at least one function block for each of one or more iterations of the industrial control application to send respective asynchronous commands to the vision engine. In response to each respective asynchronous command, the vision system may perform one or more of: continuing performing the at least one vision function, monitoring the performing the at least one vision function, providing a result of the performing the at least one vision function, and/or terminating the performing the at least one vision function. Thus, the same function block, when executed multiple times, may send different asynchronous commands to the vision system, based on state information maintained by the function block.

In some embodiments, the method may further include storing a plurality of device profiles, where each device profile facilitates communication between the programmable logic controller and the vision engine via a respective transmission protocol, such as any of the various transmission protocols mentioned above, including protocols for both deterministic and non-deterministic buses. Examples of device profiles are described below.

Thus, in some embodiments, an industrial control system may include a vision system that includes a vision element, a processor (which may be a processor core) coupled to the vision element, and a memory coupled to the processor, where the memory stores a vision engine operable to execute vision functions to control the vision element in response to received asynchronous commands. The industrial control system may also include a programmable controller, configured to implement an industrial control application, wherein the industrial control application includes at least one function block executable to provide the asynchronous commands to the vision system according to an application programming interface (API), as described above. The industrial controller may include a processor and memory, and/or may include a programmable hardware element.

As mentioned above, in some embodiments, the vision system may be separate from the programmable controller, as illustrated in FIGS. 1A and 2A, as well as FIGS. 5 and 6, discussed below.

Figure 5:
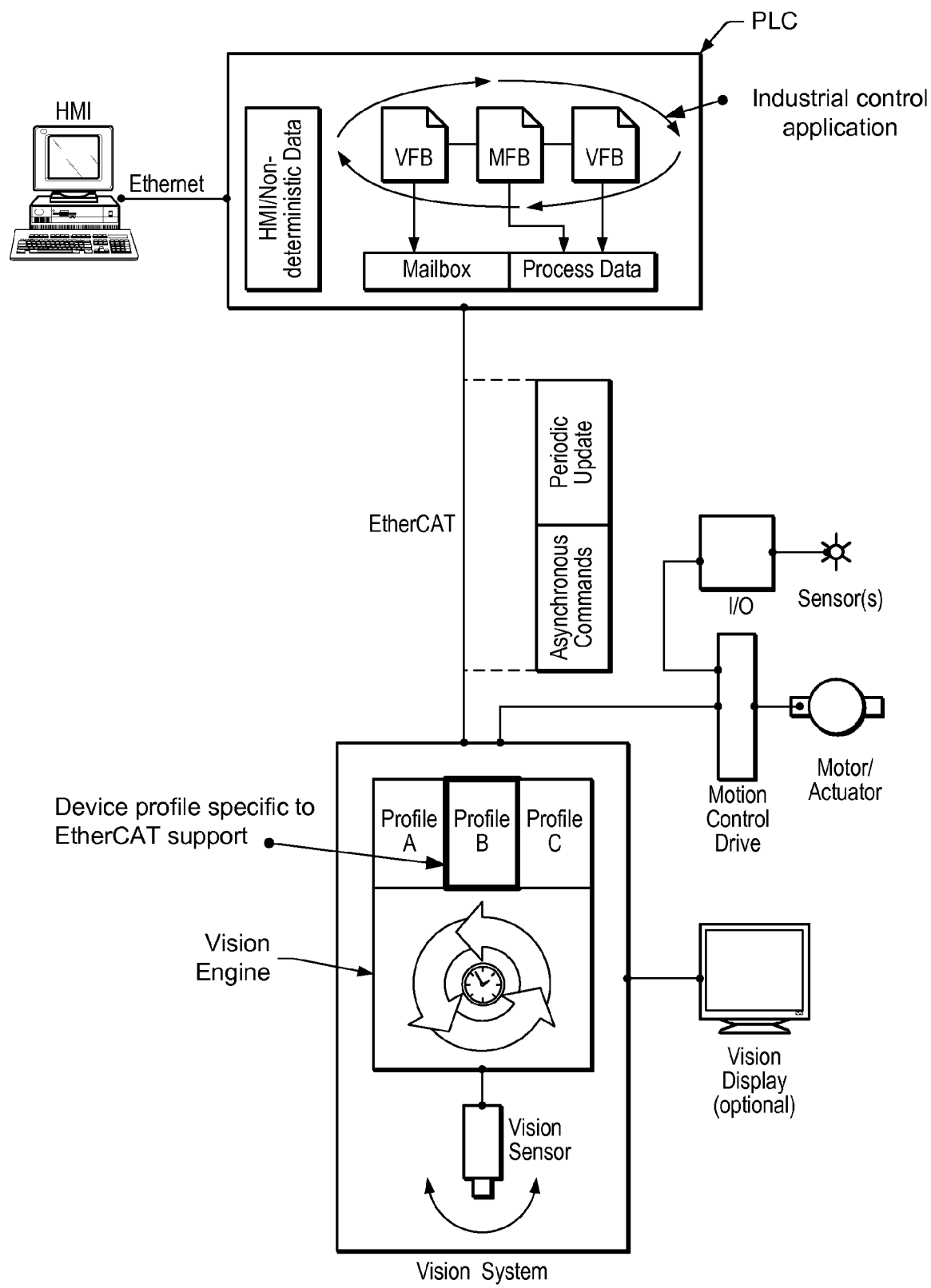
FIG. 5 illustrates an industrial control system with a deterministic communication bus, according to one embodiment.
Figure 6:
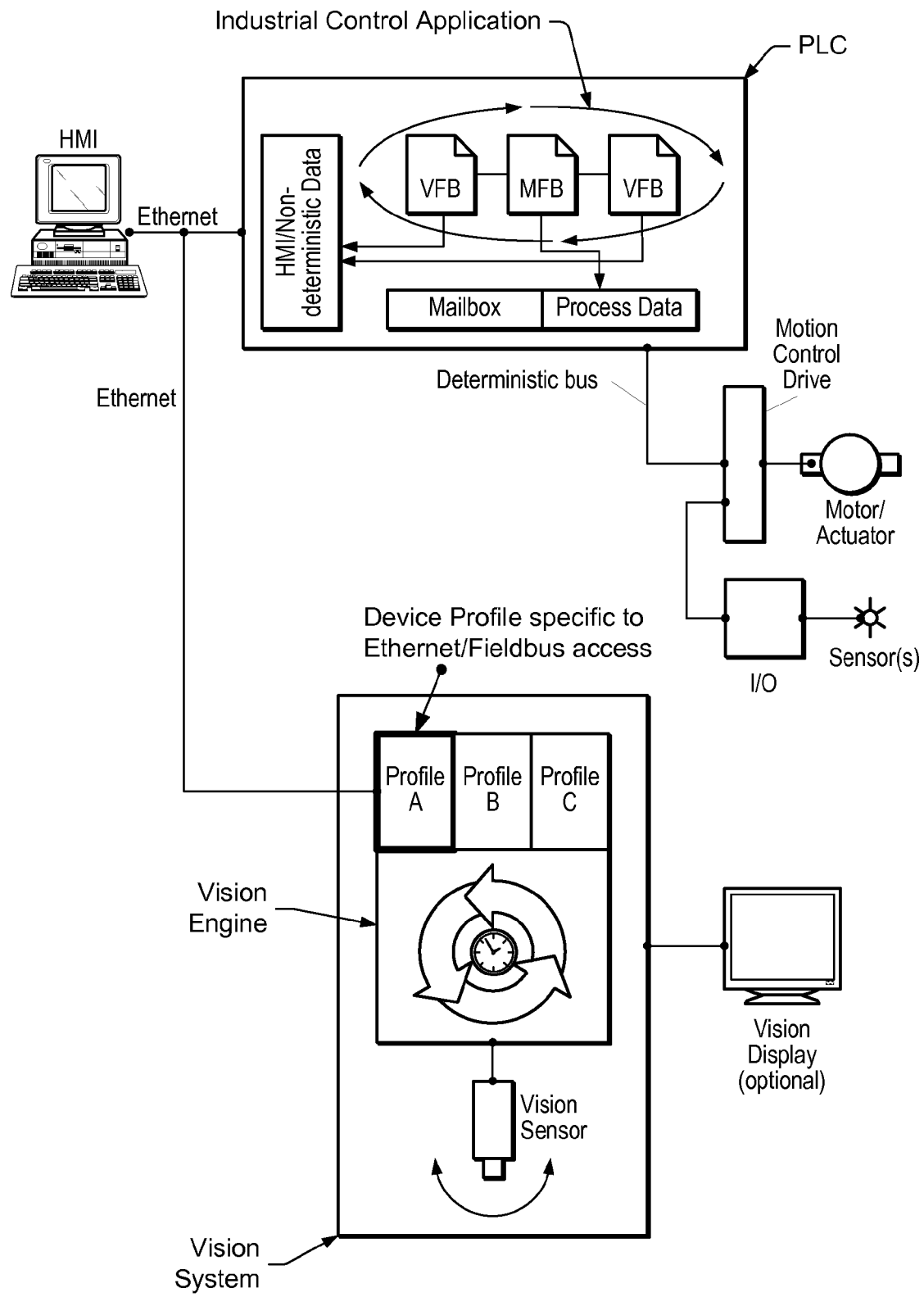
FIG. 6 illustrates an industrial control system with a non-deterministic communication bus, according to one embodiment.
Figure 7:
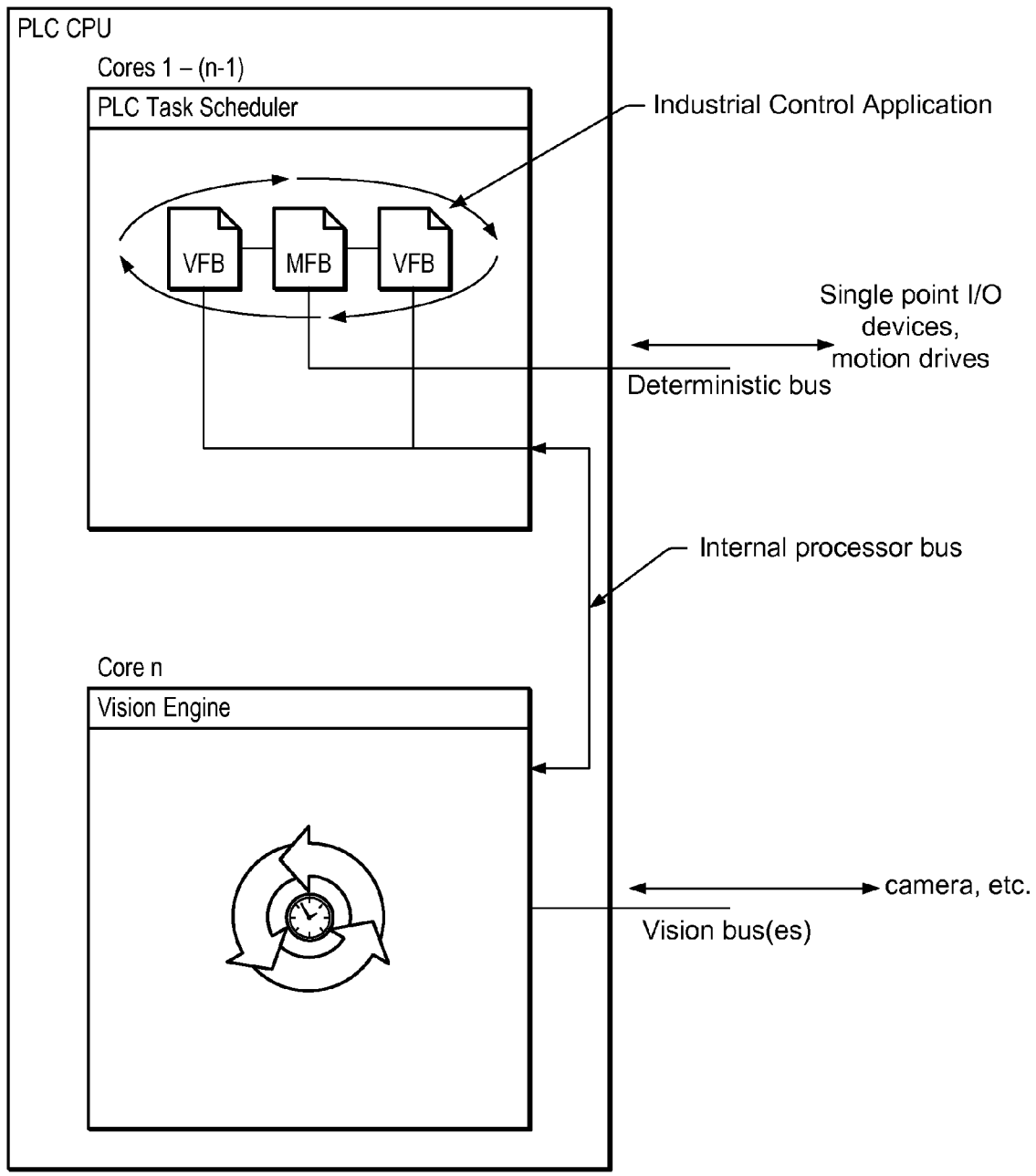
FIG. 7 illustrates an industrial control system implemented on cores of an industrial controller, according to one embodiment.

FIGS. 5-7—Exemplary Industrial Control Systems with Integrated Machine Vision

As explained above, various embodiments of the present invention include a vision engine executing on a vision system coupled to (or included in) a PLC, where the vision engine handles execution of vision functions via asynchronous commands received via a non-deterministic or a deterministic bus. In addition, the vision engine may also allow for execution of certain functions on a periodic basis so as to return periodic (process) data to the PLC if desired. The periodic data may be limited to status, state and operational parameters, but may also include some vision centric functions that need to execute cyclically.

As also described above, an API may be included provides access to the vision system, e.g., from a PLC. This API may abstract the connection between the vision system and the PLC, thus insulating the application from any peculiarities of the bus connecting the vision system and the PLC. This may facilitate various different implementations of the industrial control system with little or no impact on the industrial control application itself.

FIGS. 5-7 illustrate exemplary industrial control systems according to various embodiments of the present invention. While these figures illustrate the primary concepts of the invention, it should be noted that in other embodiments, various of the features shown may be changed or omitted, and/or additional features or components may be included.

FIGS. 5 and 6 illustrate embodiments where the vision system is separate from the programmable controller. As shown, in each of these embodiments, a PLC is coupled via a bus to a vision system. The PLC iteratively executes an industrial control application, which may include both vision function blocks (VFBs) and (in this particular example) motion function blocks (MFBs), to control and/or communicate with industrial automation devices, e.g., a motion control drive and motor/actuator, and I/O with respect to one or more sensors (via the MFBs), and to further control and/or communicate with the vision system (via VFBs), which includes a vision engine that is executable to control a vision sensor. As FIGS. 5 and 6 also show, each of these embodiments includes a host computer system coupled to the PLC for HMI functionality, and an optional vision display coupled to the vision system, e.g., for displaying vision operations or results.

The embodiment of FIG. 5 uses a non-deterministic bus (e.g., Ethernet) for communication of HMI/non-deterministic data between the PLC and the HMI for the PLC, but employs a deterministic bus (e.g., EtherCAT) for communications between the PLC and the vision system, which may include asynchronous commands or requests and periodic update data. For example, vision commands may be handled using CoE/EoE (CAN(Controller Area Network)open Over EtherCAT /Ethernet Over EtherCAT) and process data transfer over EtherCAT. In some embodiments, if the vision system is connected to the PLC via a deterministic bus, such as EtherCAT, then the API may use a mailbox (asynchronous communication) over the deterministic bus to marshal commands to the engine and receive results. For example, asynchronous data may be "handshaked" using mailbox communication. In addition the API may provide access to process data (if the vision system periodically sends such data back). For example, the process data may be refreshed in PLC memory every bus cycle, and may contain vision, motion, and/or I/O periodic data. Note that in the embodiment shown, one of the VFBs communicates via the mailbox, while the other VFB and the MFB communicate with the vision system via cyclic updating or refreshing of process data by the EtherCAT bus.

As noted above, in some embodiments, a plurality of device profiles may be included in or accessible to the vision engine to facilitate communications over various buses, and in accordance with various communication protocols. For example, in the embodiment of FIG. 5, "profile B" (labeled so for convenience only) is used to support EtherCAT communications over the EtherCAT bus. In various embodiments, the particular profile used may be determined automatically, or via manual configuration.

Note that one benefit of using such device profiles for the vision system is that in some embodiments, the vision system may be accessed by any PLC via custom function blocks using fieldbus communication protocols. An example of this use case is an NI vision system coupled to a Beckhoff PLC using EtherCAT as the connection medium between the vision system and the Beckhoff PLC.

As also indicated in FIG. 5, in some embodiments, the vision engine may be operable to service both asynchronous and periodic data. In other words, the vision engine may be operable to respond to the asynchronous commands from the PLC, and may be further operable to perform periodic functionality, e.g., monitoring and reporting with respect to tasks or scripts executing on the vision system, and/or with respect to the vision system itself.

Note that in this embodiment, the motion or industrial automation devices of the industrial control system, specifically, the motion control drive, motor/actuator, and I/O/sensor(s), are daisy-chained from the vision system in accordance with the deterministic EtherCAT bus. This is a feature of the EtherCAT bus protocol, and is not a required feature of the invention.

Thus, in some embodiments, the industrial control system may utilize a deterministic bus, such as EtherCAT, to communicate between the vision system and the PLC.

FIG. 6 illustrates an embodiment similar to that of FIG. 5, but where a non-deterministic bus or network is used for communications between the vision system and the PLC. In embodiments using a non-deterministic bus or network, such as Ethernet, the API may use TCP/IP or some other Ethernet-based protocol to marshal commands to the engine on the vision systems and receive data. Note that for brevity, only those features different from the embodiment of FIG. 5 are discussed.

As FIG. 6 shows, in this embodiment, an Ethernet bus/network is used to couple the PLC to the vision system. In the embodiment shown, both VFBs communicate via the non-deterministic bus, while the MFB communicates with the vision system via cyclic updating or refreshing of process data by the bus used by the automation or motion and sensor devices in the system. Note that the non-deterministic data (indicated as HMI/Non-deterministic Data in FIG. 6, where HMI refers to Human Machine Interface) communicated on the non-deterministic bus may include periodic data, as well as asynchronous mailbox commands for the vision system (and any other vision systems connected to the non-deterministic bus). For example, the process data, which may include vision, motion, and I/O periodic data, may be refreshed in PLC memory every bus cycle.

As also indicated in FIG. 6, in this "non-deterministic bus" embodiment, "profile A" (labeled so for convenience only) is used to communicate with the vision system, thus illustrating the flexibility that use of such device profiles provides. Thus, vision commands generated by the vision function blocks may be handled via non-deterministic protocols, such as TCP/IP, Modbus-TCP, etc. In contrast, note that for the automation/motion devices, a deterministic bus may be required, e.g., EtherCAT.

Thus, due to the abstraction provided by the API described herein, a single application may be used with little or no changes in any of various embodiments, including deterministic and non-deterministic bus-based systems.

Further Embodiments

While in the embodiments of FIGS. 5 and 6, the vision system is implemented on a different device or processor from the PLC, in other embodiments, the vision system may be implemented on the same device (see, e.g., FIGS. 1B and 2B). For example, as noted above, in some embodiments, the programmable controller may include a plurality of processor cores, where the industrial control application is deployed to a first at least one processor core of the programmable controller, and the vision system is deployed to at least one other processor core of the programmable controller.

FIG. 7 illustrates an embodiment of such a multi-core implementation. As may be seen, in this embodiment, a PLC CPU (central processing unit) may include a plurality of processing cores, in this case, n cores, where cores 1 through (n−1) are used to execute the industrial control application (via a PLC task scheduler), and where core n is used to execute the vision engine.

Thus, in this approach a separate PLC and vision system is not required, but rather, one or more cores of the PLC may be allocated to the application (main logic scheduler), and a dedicated core allocated to run the vision engine. An advantage of this model is the ability to use "non-intelligent" vision interfaces, i.e., vision buses, to vision sensors, e.g., a1394 interface to 1394 cameras, a camera link interface to a camera link sensor, etc. The use of a separate core for the vision system may guarantee minimal to zero usage of the cores that execute the users PLC task (industrial control application) for vision function execution.

Like the exemplary applications of FIGS. 5 and 6, the exemplary industrial control application of FIG. 7 includes two VFBs and one MFB. Note that the same vision function block API is used or executed by the industrial control application as in the embodiments discussed above, but instead of communicating over an external bus, the API now communicates over an internal processor bus to marshal the API and retrieve the data, as FIG. 7 shows. In contrast, the MFB communicates with automation/motion devices via a deterministic bus, such as EtherCAT. Note that in this embodiment, since communication between the industrial control application and the vision engine is via an internal processor bus, no device profiles are included.

As noted above, in some embodiments, the programmable controller may be implemented with a PHE (programmable hardware element), such as an FPGA. In other words, the programmable controller may be or include a programmable hardware element. In these cases, the PHE may include or be coupled to a memory for storing the API.

Thus, using various embodiments of the systems and methods described above, instead of configuring a vision system/camera separately, or writing a custom application that executes on it, a vision engine may be deployed onto the vision system, and may handle asynchronous access to vision functions as well as allow for certain functions to run periodically and return data, where access to this data may be provided to the PLC via vision function blocks. In addition a device profile (e.g., using a CANopen object dictionary, CIP Object library, etc.) may be provided that allows for creation of custom function blocks or access to the vision system, e.g., via fieldbus communication function blocks. This model may provide several advantages to the PLC user. For example, the application/task to control a machine or a process can be sequenced on one controller (i.e. the PLC), and so the user does not have to distribute an industrial control application. Moreover, it may be much easier to synchronize sequential logic, motion, and vision operations, since the function blocks may automatically return status and data in the same task, thus, the user is no longer required to create arbitrary tags to synchronize and coordinate execution of the application. Additionally, the industrial control application may be much more scalable and portable, since it is based on standard function blocks not tags. Also, by providing device profiles for different buses, easy access to the vision system may be provided, especially for users that use a PLC that is not from the same vendor as the vision system.

It should be noted that while the systems and method described above are directed specifically to integrating vision functionality in an industrial control system, in other embodiments, the above-described techniques may be applied to general data acquisition, e.g., using a DAQ engine. In other words, the above described systems and method are contemplated as being applicable to DAQ in general, not just vision.

Thus, various embodiments of the above systems and methods may facilitate industrial control system with integrated machine vision.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-implemented method for performing industrial control, comprising:
    storing a vision engine on a vision system, wherein the vision engine is configured to execute vision functions to control a vision element in response to received asynchronous commands;
    storing an application programming interface (API) and an industrial control application in a programmable controller;
    wherein the API comprises a plurality of function blocks, including at least one vision function block, that are configured to be included in the industrial control application and provide access to the vision engine, wherein the plurality of function blocks include executable code and state information, and are executable to send the asynchronous commands to the vision engine via a bus, wherein the bus is non-deterministic or deterministic;
    inserting at least one vision function block of the API into the industrial control application, wherein the industrial control application comprises a graphical program comprising one or more function blocks;
    executing the industrial control application on the programmable controller based on a scanning architecture that receives inputs from the vision system via the bus, including executing the at least one vision function block to send a corresponding at least one asynchronous command to the vision engine;
    the vision engine performing at least one vision function corresponding to the at least one vision function block in response to the at least one asynchronous command, and sending resultant data to the industrial control application; and
    the industrial control application storing the resultant data;
    wherein the at least one vision function block, when executed multiple times, sends different commands to the vision system based on the state information maintained by the at least one vision function block; and
    wherein, in response to each respective command, the vision system performs one or more of: continuing performing the at least one vision function, monitoring the performing of the at least one vision function, providing a result of the performing the at least one vision function, or terminating the performing the at least one vision function.

2. The method of claim 1, further comprising:
    storing at least one custom function block, wherein the at least one custom function block is configured to be included in the industrial control application, wherein the at least one custom function block specifies execution of at least one custom vision function, wherein creating the industrial control application comprises inserting the at least one custom function block into the industrial control application;
    deploying first program instructions corresponding to the custom function block to the vision engine, wherein the first program instructions implement the at least one custom vision function;

wherein said executing the industrial control application comprises executing the custom function block, wherein said executing the custom function block comprises sending a corresponding one or more first asynchronous commands to the vision engine; and the vision engine executing the first program instructions to perform the at least one custom vision function corresponding to the at least one custom function block in response to the one or more first asynchronous commands.

3. The method of claim 1, wherein said executing the industrial control application comprises executing the industrial control application in an iterative manner, the method further comprising:

executing the at least one vision function block for each of one or more iterations of the industrial control application to send respective asynchronous commands to the vision engine; and in response to each respective asynchronous command, the vision system performing one or more of:
continuing performing the at least one vision function;
monitoring said performing the at least one vision function;
providing a result of said performing the at least one vision function; or terminating said performing the at least one vision function.

4. The method of claim 1, further comprising:
storing a plurality of device profiles, wherein each device profile facilitates communication between the programmable controller and the vision engine via a respective transmission protocol.

5. The method of claim 1,
wherein the vision system is separate from the programmable controller.

6. The method of claim 1,
wherein the programmable controller comprises a plurality of processor cores;
wherein the industrial control application is deployed to a first at least one processor core of the programmable controller; and
wherein the vision system is deployed to at least one other processor core of the programmable controller.

7. The method of claim 1,
wherein the programmable controller comprises a programmable hardware element.

8. The method of claim 1, wherein the API comprises one or more graphical program nodes;
wherein the graphical program comprises a plurality of interconnected nodes that visually indicate functionality of the graphical program, and wherein the graphical program includes at least one graphical program node from the API.

9. A non-transitory computer-readable memory medium that stores program instructions for developing an industrial application, wherein the program instructions are executable to implement:

a vision engine, configured to execute vision functions to control a vision element in response to received asynchronous commands from an industrial control application executing on a programmable controller, wherein the vision engine is configured to be deployed to a vision system;

an application programming interface (API) that provides access to the vision engine from the industrial control application executing on the programmable controller, wherein the industrial control application comprises a graphical program comprising one or more function blocks;

wherein the API comprises a plurality of function blocks, including at least one vision function block, that are configured to be included in the industrial control application and provide access to the vision engine, wherein the plurality of function blocks include executable code and state information, and are executable to send the asynchronous commands to the vision engine via a bus, wherein the bus is non-deterministic or deterministic, and wherein the industrial control application is configured to execute the at least one vision function block to send a corresponding at least one asynchronous command to the vision system; and wherein the vision engine is configured to perform at least one vision function corresponding to the at least one vision function block in response to the at least one asynchronous command received from the industrial control application executing on the programmable controller based on a scanning architecture that receives inputs from the vision system via the bus, and to send resultant data to the industrial control application;

wherein the at least one vision function block, when executed multiple times, sends different commands to the vision system based on the state information maintained by the at least one vision function block; and wherein, in response to each respective command, the vision system performs one or more of: continuing performing the at least one vision function, monitoring the performing of the at least one vision function, providing a result of the performing the at least one vision function, or terminating the performing the at least one vision function.

10. The non-transitory computer-readable memory medium of claim 9, wherein the program instructions further implement at least one custom function block, wherein the at least one custom function block is configured to be included in the industrial control application, and wherein the at least one custom function block is executable to send a corresponding one or more asynchronous commands to the vision engine to perform at least one custom vision function; and wherein the vision engine is further configured to perform the at least one custom vision function corresponding to the at least one custom function block in response to the one or more asynchronous commands.

11. The non-transitory computer-readable memory medium of claim 9, wherein the industrial control application is configured to be executed in an iterative manner, including executing the at least one vision function block for each of one or more iterations to send respective asynchronous commands to the vision engine, wherein, in response to each respective asynchronous command, the vision system is configured to perform one or more of:
continue performing the at least one vision function;
monitor said performing the at least one vision function;
provide a result of said performing the at least one vision function; or
terminate said performing the at least one vision function.

12. The non-transitory computer-readable memory medium of claim 9,
wherein the memory medium further stores a plurality of device profiles, wherein each device profile facilitates communication between the programmable controller and the vision engine via a respective transmission protocol.

13. The non-transitory computer-readable memory medium of claim 9, wherein the industrial control application comprises a graphical program, and wherein the API comprises one or more graphical program nodes corresponding to the plurality of function blocks, wherein the graphical program nodes are selectable to be included in the industrial control application.

14. An industrial control system, comprising:
a vision system, comprising:
a vision element;
a processor, coupled to the vision element; and
a memory, coupled to the processor, wherein the memory stores a vision engine configured to execute vision functions to control the vision element in response to received asynchronous commands; and
a programmable controller, configured to implement an industrial control application, wherein the industrial control application comprises a graphical program comprising one or more function blocks, including at least one vision function block executable to provide the asynchronous commands to the vision system;
wherein the programmable controller further stores an application programming interface (API), wherein the API comprises a plurality of function blocks that are configured to be included in the industrial control application and provide access to the vision engine from the industrial control application executing on the programmable controller, wherein the plurality of function blocks include executable code and state information, and are executable to send the asynchronous commands to the vision engine via a bus, wherein the bus is non-deterministic or deterministic, and wherein the industrial control application is configured to execute, based on a scanning architecture, the at least one vision function block to send a corresponding at least one asynchronous command to the vision system;
wherein the vision engine is configured to perform at least one vision function corresponding to the at least one vision function block in response to the at least one asynchronous command, and to send resultant data to the industrial control application; and
wherein the industrial control application is configured to store the resultant data;
wherein the at least one vision function block, when executed multiple times, sends different commands to the vision system based on the state information maintained by the at least one vision function block; and
wherein, in response to each respective command, the vision system performs one or more of: continuing performing the at least one vision function, monitoring the performing of the at least one vision function, providing a result of the performing the at least one vision function, or terminating the performing the at least one vision function.

15. The industrial control system of claim 14, wherein the programmable controller comprises a processor and memory.

16. The industrial control system of claim 14, wherein the programmable controller comprises a programmable hardware element.

17. The industrial control system of claim 14, wherein the industrial control application further includes at least one custom function block, wherein the at least one custom function block is executable to send a corresponding one or more asynchronous commands to the vision engine to perform at least one custom vision function; and wherein the vision engine is further configured to perform the at least one custom vision function corresponding to the at least one custom function block in response to the one or more asynchronous commands.

18. The industrial control system of claim 14, wherein the industrial control application is configured to be executed in an iterative manner, including executing the at least one vision function block for each of one or more iterations to send respective asynchronous commands to the vision engine, wherein, in response to each respective asynchronous command, the vision system is configured to perform one or more of:
continue performing the at least one vision function;
monitor said performing the at least one vision function;
provide a result of said performing the at least one vision function; or
terminate said performing the at least one vision function.

19. The industrial control system of claim 14, wherein the memory further stores a plurality of device profiles, wherein each device profile facilitates communication between the programmable controller and the vision engine via a respective transmission protocol.

20. The industrial control system of claim 14,
wherein the programmable controller comprises a plurality of processor cores;
wherein the processor comprises a first at least one processor core of the programmable controller; and
wherein the vision system comprises a second at least one processor core of the programmable controller.

21. The industrial control system of claim 14, wherein the API further comprises one or more graphical program nodes corresponding to the plurality of function blocks, wherein the graphical program nodes are selectable to be included in the industrial control application.

* * * * *